(12) United States Patent
Brioschi et al.

(10) Patent No.: US 10,195,776 B2
(45) Date of Patent: Feb. 5, 2019

(54) TOGGLE CLOSURE ASSEMBLY FOR INJECTION PRESS

(71) Applicant: NEGRI BOSSI S.P.A., Cologno Monzese (Milan) (IT)

(72) Inventors: Angelo Brioschi, Cologno Monzese (IT); Maurilio Meschia, Cologno Monzese (IT)

(73) Assignee: NEGRI BOSSI S.P.A., Cologno Monzese (Milan) (IT)

( * ) Notice: Subject to any disclaimer, the term of this patent is extended or adjusted under 35 U.S.C. 154(b) by 0 days.

(21) Appl. No.: 15/402,644

(22) Filed: Jan. 10, 2017

(65) Prior Publication Data

US 2017/0203483 A1    Jul. 20, 2017

(30) Foreign Application Priority Data

Jan. 14, 2016  (IT) .................. 102016000003046

(51) Int. Cl.
| | |
|---|---|
| *B29C 45/66* | (2006.01) |
| *B29C 45/68* | (2006.01) |
| *B29C 33/20* | (2006.01) |

(52) U.S. Cl.
CPC ............ *B29C 45/661* (2013.01); *B29C 33/20* (2013.01); *B29C 45/681* (2013.01)

(58) Field of Classification Search
CPC ..... B29C 45/661; B29C 45/681; B29C 33/20; B30B 1/10; B30B 1/103; B30B 1/16
See application file for complete search history.

(56) References Cited

U.S. PATENT DOCUMENTS 3,015,848 A * 1/1962 Hollfritsch ............ B29C 45/681
                                                      425/593
3,345,691 A * 10/1967 Aoki .................. B29C 45/1751
                                                      425/171

(Continued)

FOREIGN PATENT DOCUMENTS

| DE | 10 2004 009 603 | * 10/2004 |
| EP | 0 164 419 B1 | 12/1985 |

(Continued)

OTHER PUBLICATIONS

IT Search Report, dated Sep. 7, 2016, from corresponding IT application.

*Primary Examiner* — James P Mackey
(74) *Attorney, Agent, or Firm* — Young & Thompson (57) ABSTRACT

A toggle mold closure assembly for injection presses includes: fixed, mobile and reaction planes, mounted on columns; a control unit of the toggle, having four pairs of levers, arranged symmetrically at two sides, in upper and lower parts of the structure, interconnected by a pin and to the reaction plane and mobile plane by respective pins; and an actuation unit of the control element. The control unit is placed on the axis of the toggle in the middle of the pairs of main side levers, which have an outward movement. The control unit is connected, by control connecting rods, to the levers of the toggle connected to the reaction plane, and is placed between the central connection pin of the levers and the reaction plane. The control unit is provided with heads for connection to the connecting rods external to the reaction plane and turned towards the reaction plane.

19 Claims, 7 Drawing Sheets

(56) References Cited

U.S. PATENT DOCUMENTS

| | | | | |
|---|---|---|---|---|
| 4,880,792 | A | | 11/1989 | Yoshioka et al. |
| 4,938,682 | A | * | 7/1990 | Kadoriku ............... B29C 45/661 425/451.6 |
| 5,052,908 | A | * | 10/1991 | Inaba ..................... B22D 17/26 425/150 |
| 5,102,327 | A | * | 4/1992 | Reinhart ................ B29C 45/66 100/918 |
| 5,178,888 | A | * | 1/1993 | Wurl ..................... B29C 45/661 425/451.5 |
| 5,252,286 | A | * | 10/1993 | Bugatti ................. B29C 45/681 264/328.1 |
| 5,370,524 | A | * | 12/1994 | Liang .................. B29C 45/4005 425/451.6 |
| 5,603,969 | A | * | 2/1997 | Guindani ............. B29C 45/681 100/272 |
| 5,804,224 | A | * | 9/1998 | Inaba ................. B29C 45/1777 425/150 |
| 6,364,655 | B1 | * | 4/2002 | Wang ................... B29C 45/681 425/589 |
| 8,814,559 | B2 | * | 8/2014 | Jon ..................... B29C 45/661 425/593 |
| 9,802,350 | B2 | * | 10/2017 | Sasaki ................. B29C 45/661 |
| 2013/0224329 | A1 | | 8/2013 | Keinath |
| 2014/0295020 | A1 | | 10/2014 | Senga |
| 2014/0322375 | A1 | | 10/2014 | Wang |

FOREIGN PATENT DOCUMENTS

| | | |
|---|---|---|
| EP | 0 511 170 A2 | 10/1992 |
| EP | 0 679 494 A2 | 11/1995 |
| JP | S57 83827 U | 5/1982 |
| JP | S63 141716 U | 9/1988 |
| JP | 2004 181894 A | 7/2004 |
| WO | 91/06415 A1 | 5/1991 |
| WO | 91/18264 A1 | 11/1991 |

* cited by examiner

FIG.1

Prior Art

TOGGLE CLOSURE ASSEMBLY FOR INJECTION PRESS

The present invention relates to a toggle mould closure assembly for injection presses.

STATE OF THE ART

Injection presses can be provided with a closure assembly of the mechanical type with single or double toggle. The toggle closure system in the conventional configuration, as described for example in the patent application WO 91/18264, during the movement of opening closes towards the interior of the machine.

Figure 1:
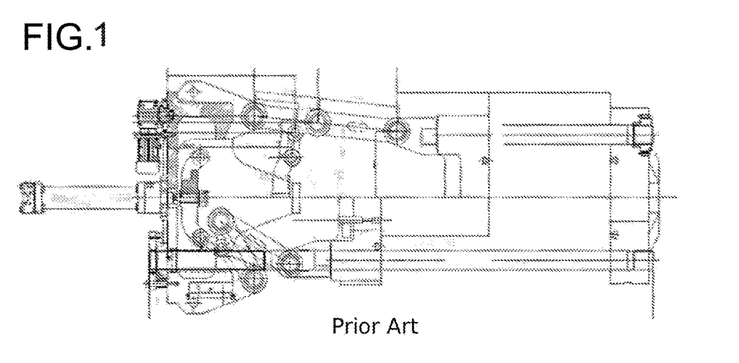
FIG. 1 is a side view, partially sectioned, of a toggle closure assembly for injection press according to the prior art, showing in the upper half the condition of mould closed and in the lower half the condition of mould open.

In the accompanying FIG. 1 a toggle can be seen in the upper half in the conventional configuration in the condition of closed mould, while in the lower half the same toggle is in the condition of open mould with the main levers collected inside.

Over the years different configurations have been developed of toggles in classic configuration optimised in order to:

1—improve the kinematics of the movement (avoid high transmission ratios between the movement of the actuation piston and the movement of the plane in order to reduce the inertia of the system seen from the piston);
2—reduce the overall dimension of the toggle with the same opening stroke;
3—increase the opening strokes;
4—create an axis of thrust as central as possible compatibly with the space required for housing the elements which constitute the assembly which has the function of extracting the moulded parts from the mould;
5—reduce the angle of slant of the levers to avoid creating a high bending moment on the reaction plane.

Objectives 1 and 2 are in contrast in that in order to reduce the dimensions of the toggle high transmission ratios have to be used.

Similarly objectives 2, 3, 4 and 5 are in contrast in that in order to reduce the dimensions of the toggle or increase the stroke of opening the upper levers have to be distanced from the lower levers or the slant of the levers increased in order to make room for the movement and consequently move the thrust axis away from the centre of the machine.

The toggle solution described provides a system of hydraulic movement by means of one or more hydraulic cylinders or alternatively a system of electric actuation whereof the patent EP 164419 B1 is an example.

In order to improve the performances of the toggle with reference to the five points listed above, toggles have been developed with movement of the levers during the opening outwards.

The patent application WO91/6415 represents one of the first solutions thereof. With this solution it is possible to obtain high strokes of opening, good kinematics and a central thrust with levers almost parallel to the machine axis, with mould closed, yet the toggle is not very compact, having to house inside the reaction plate the movement of the control element of the levers connected to the actuation piston. Moreover, having to house the control system outside the levers, the levers have to be very close to the machine axis, making housing of the extraction assembly difficult.

In a subsequent solution described in EP 679494 the control element has been made by means of a plate placed between the mobile plane and the pin of connection between the main levers provided with two wings to connect said plane to the control connecting rods of the main levers. The solution with the control plane placed in intermediate position allows a broad movement of the levers and therefore high opening strokes;
the possibility of changing the length of the levers in order to modify the maximum opening stroke without modifying the other elements of the structure;
thrust parallel to the machine axis with centre distance of the levers as a function only of the space to be left for the extraction system.

The solution does however have some disadvantages:
the intermediate control plane, having to perform a very long stroke and being guided on the columns, must never, in any position of regulation of the mould thickness, reach the position in which the threads start on the columns for the regulation of the thickness of the mould. This brings about the need to create a control plane with very long wings for connection to the connecting rods subject to a high bending moment;
the length of the toggle is conditioned by the need for the intermediate control plane not to pass over the threads of the column;
the weight and the complexity of the intermediate control plane are high and consequently this plane has to be provided with additional supports on the bed to avoid flexures of the columns;
during the phase of compression of the mould, if the latter has defects of parallelism, the levers are subjected to different load values and consequently also the intermediate control plane receives thrusts of reaction from the upper connecting rods different from the thrusts of the lower connecting rods which are discharged on the columns causing the bending thereof. To avoid these effects it is necessary to guarantee for the intermediate plane a good guide on the bed of the machine.

In the patent EP 511170, in order to avoid the limitation of not passing with the intermediate plane over the threads of the columns, the intermediate plane is placed between the reaction plane and the central pin for connection of the levers and is guided on hollow cylinders concentric to the columns. All the other problems remain, linked to the weight, to the complexity of the intermediate control plane and to the problems linked to the unbalancing of the forces on the main levers which require not only a guide on the columns of the moulds assembly but also additional guides on the plane.

A different solution illustrated in EP 511170 provides for the overturning of the movement of the main connecting rods. In this way the intermediate plane, constituted by a ring-shaped element guided on the columns, during the movement moves close to the mobile plane and not to the reaction plane, eliminating the problem of not passing with the guides of the intermediate control plane over the threads of the columns. The problems remain unchanged that are linked to the weight, to the complexity of the intermediate control plane and to the problems linked to the unbalancing of the forces on the main levers which require not only a guide on the columns of the moulds assembly but also additional guides on the plane. More particularly the structure of the intermediate control element has to have such a shape as to surround the levers, leaving free the central part for the extraction assembly.

In addition to these problems, this solution requires for the type of relative movement that the control pistons or the electric actuators be placed, not as in the preceding solutions between control element and reaction plane, rather between the intermediate plane and the mobile plane.

JP 2004 181894 A provides a control system of the toggle integral with the mobile plane by means of guide columns. Therefore, in order to have correct and functioning kinematics, it is obligatory for the control element to have protuberances turned towards the mobile plane. If these were turned towards the reaction plane the toggle would not be kinematically correct. The system presented in this document requires the guide columns that constitute an integral part of the control system to be integral with the mobile plane and not with the reaction plane.

Therefore the guide columns are subjected to axial loads during the phases of movement and during the phase of locking of the mould.

Object OF THE INVENTION

The object of the invention is that of eliminating the disadvantages and the problems of the different solutions of the prior art illustrated previously.

More particularly an object of the invention is that of providing a toggle mould closure assembly for injection press, in which the toggle has high compactness.

Another object of the invention is to provide such a closure assembly in which there is a parallel thrust close to the machine axis compatibly with the spaces required by the central extractor.

Yet another object of the invention is that of providing such an assembly with the possibility of varying the maximum strokes of opening by changing the length of the levers without modifying the other elements of the toggle.

Again a further object of the invention is that of providing such an assembly in which there is a guide of the control element of the levers which is simple and such as to guarantee proper functioning also in the cases of imbalance of the thrust on the levers caused by non-parallel moulds.

Last but not least, an object of the invention is that of providing such a mould closure assembly which is simple and therefore economical to manufacture and at the same time extremely reliable.

These objects are achieved by the mould closure assembly according to the invention, which has the features of the annexed independent claim 1.

Advantageous embodiments of the invention are disclosed by the dependent claims.

Substantially, the toggle mould closure assembly for injection presses according to the invention comprises:

a fixed plane, a mobile plane and a reaction plane, mounted on columns, a control element of the toggle, made up of four pairs of levers, arranged symmetrically at the two sides and in the upper and lower part of the structure, connected one to the other and to said reaction plane and mobile plane by means of respective pins, actuation means of said control element, in which the control element is placed on the axis of the toggle in the middle of the pairs of main side levers, which have an outward movement, the control element is connected, by means of control connecting rods, to the levers of the toggle connected to the reaction plane, and is situated between the central connection pin of the levers and the reaction plane, the control element is provided with heads for connection to the connecting rods external to the reaction plane and turned towards the reaction plane, and the control element is mounted on guides attached to the reaction plane.

BRIEF DESCRIPTION OF THE DRAWINGS

Further features of the invention will be made clearer by the following detailed description, referred to its embodiments purely by way of a non-limiting example and illustrated in the accompanying drawings, in which:

FIGS. 9 *a*), *b*) are, respectively, a perspective view and an end view of the reaction plane of the toggle;

DESCRIPTION OF PREFERRED EMBODIMENTS

Figure 2:
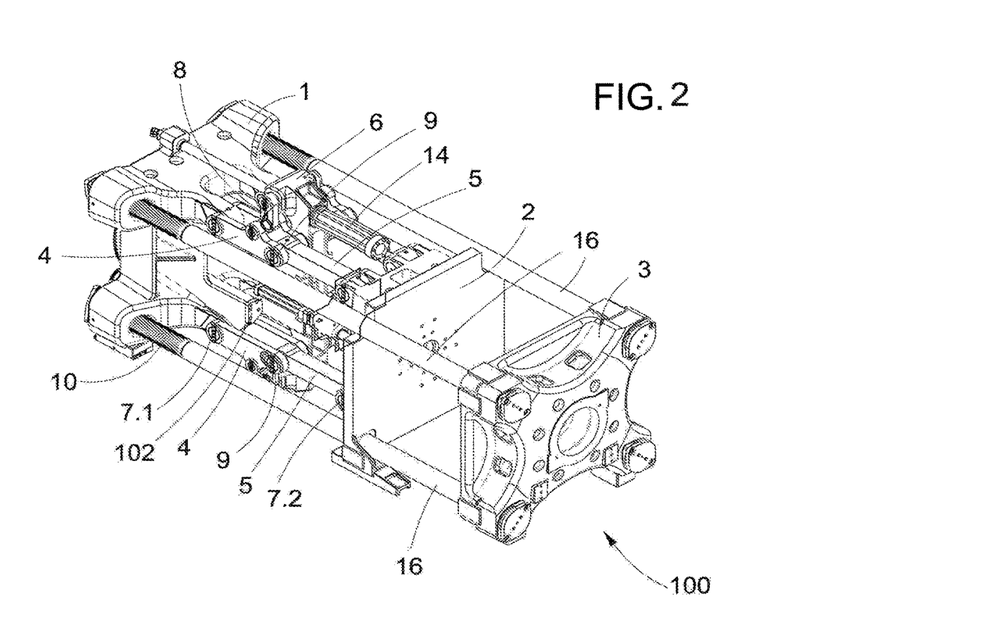
FIG. 2 is a perspective view of a mould closure assembly according to the invention, in the condition of mould closed.

Referring to the accompanying drawings, and for the time being in particular to FIG. 2, a toggle mould closure assembly is shown for injection presses according to the present invention, in the position of mould closed, denoted overall by reference numeral 100.

The assembly is constituted mainly by a fixed plane 3, by a mobile plane 2, by a reaction plane 1, and by the control element 6 of the main levers of the toggle, denoted by reference numerals 4 and 5, connected one to the other by means of a pin 9 and to the planes 1 and 2 by means of respective pins 7.1 and 7.2.

Figure 7:
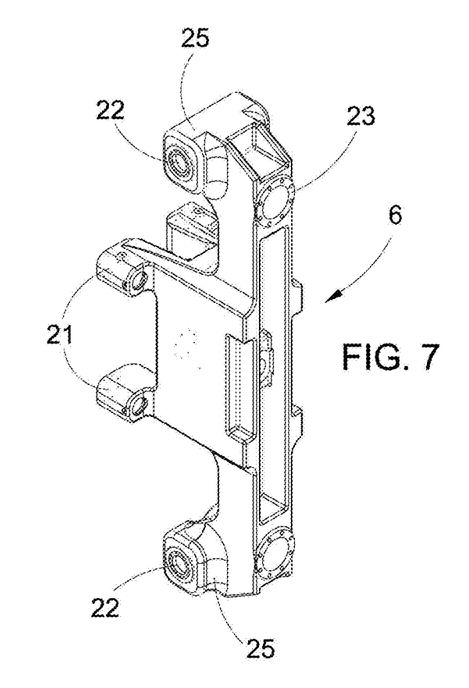
FIG. 7 is an axonometric view of the control element of the toggle.

The toggle, which is of the double type, comprises four pairs of levers 4, 5, arranged symmetrically at the two sides and in the upper and lower part of the structure, with the control element 6 (seen more clearly in FIG. 7) placed on the axis of the toggle in the middle of the pairs of side main levers. However, for reasons of simplicity, in the following description, if not absolutely necessary for the understanding of the functioning of the toggle, reference will be made thereto with reference to a single or to two pairs of levers 4, 5, accordingly.

The control of each pair of main levers 4, 5 takes place by means of a respective connecting rod 8 which connects the control element 6, which moves on a linear trajectory in axis with the toggle, and the lever 4 which rotates around the pins 7.1 and 9.

Figure 3:
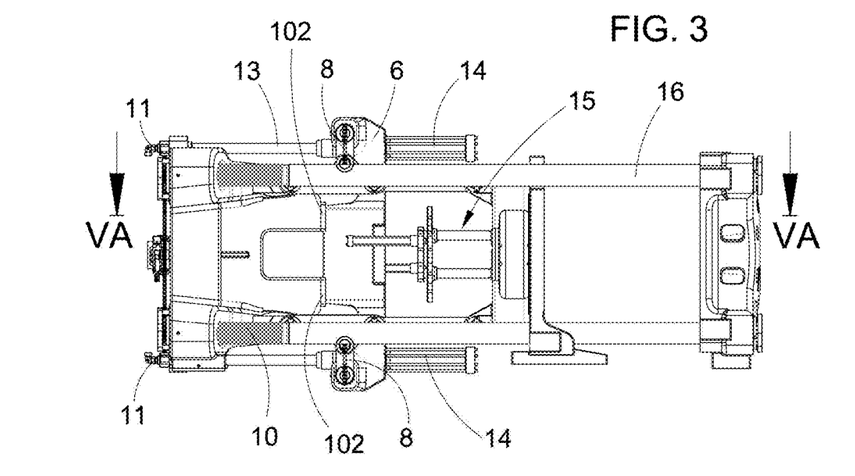
FIG. 3 is a side elevation view of the assembly of FIG. 2.
Figure 4:
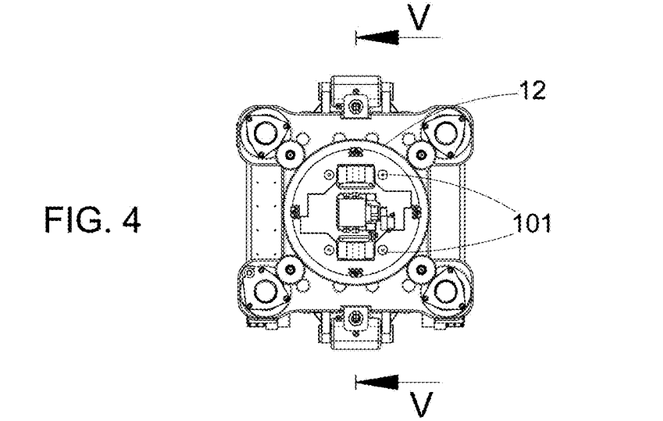
FIG. 4 is a view from the left-hand side of FIG. 3.

The three planes 1, 2 and 3 of the moulds assembly are connected to four columns 16 arranged at the vertices of a rectangle, having a threaded end 10, with which respective adjustment nuts 11 (FIG. 3) engage which can be regulated by means of a crown 12 (FIG. 4) on the threads 10 of the columns in order to create the distance between mobile plane 2 and fixed plane 3 such that with the toggle distended the interference is created, useful for generating the closure force in the mould placed between the mobile plane 2 and the fixed plane 3.

In the embodiment according to FIGS. 2-6, the movement of the control element 6 takes place by means of two pistons 14 placed one above and the second below the toggle. The rod 13 of the pistons is connected to the reaction plate 1; with the toggle distended, i.e. with mould closed, the pistons are completely extended.

FIGS. 5, 5A and 6, 6A represent respectively a sectioned view on the median vertical plane and a view on a horizontal plane of the toggle, respectively in the condition of mould closed and of mould completely open. In these views the structure of the control element 6 can be seen (detail of FIG. 7). The control element moves on a system of four columns 24, attached at the two ends to the reaction plane 1, apt to guarantee the correct linear movement of the control element also in the conditions of unbalanced load on the levers of the toggle. In this case it is a solution borrowed from the classic toggle configuration with movement of the levers inwards. At the same time this configuration does not require the control element to be guided on the columns of the toggle, with clear dimensional advantages.

Figure 5:
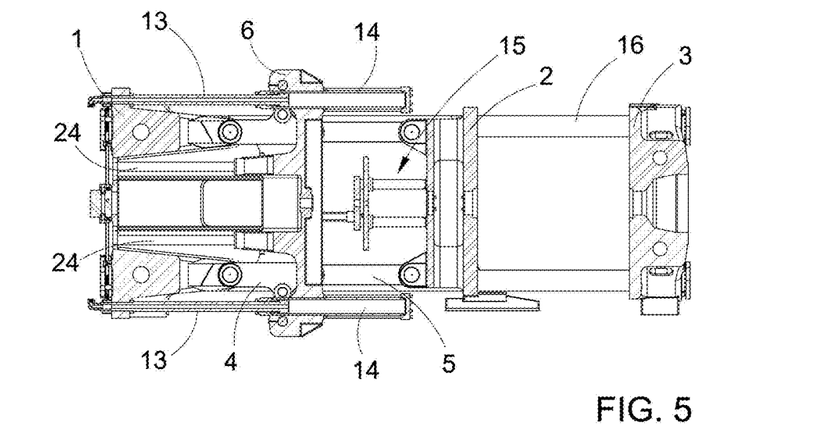
FIG. 5 is a median sectioned view taken along plane V-V of FIG. 4.
Figure 5A:
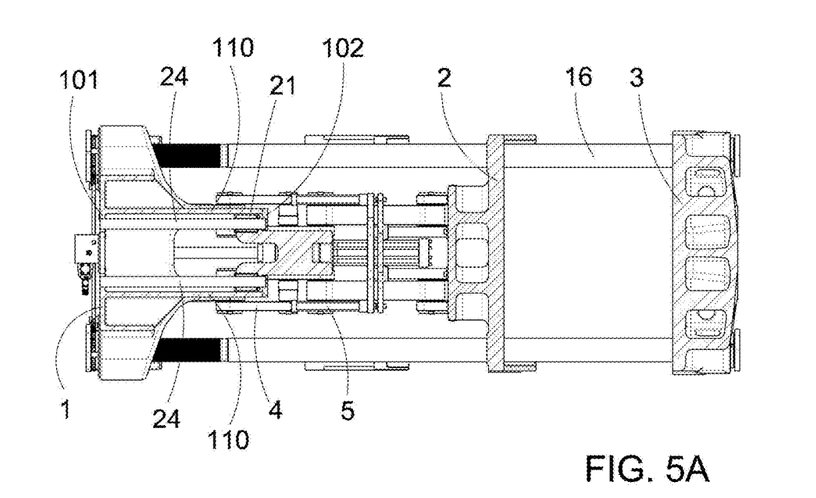
FIG. 5*a* is a section taken along plane VA-VA of FIG. 3.
Figure 6:
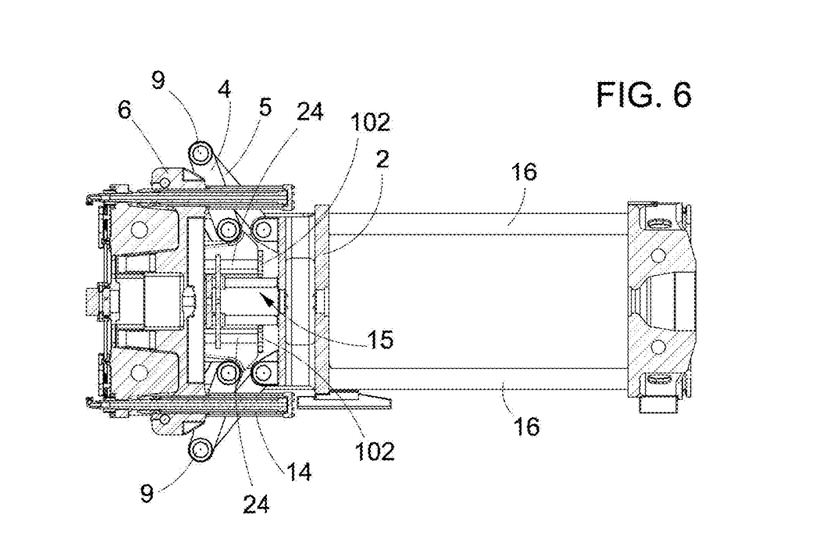
FIG. 6 is a median sectioned view like that of FIG. 5, with the toggle in the condition of mould completely open.
Figure 6A:
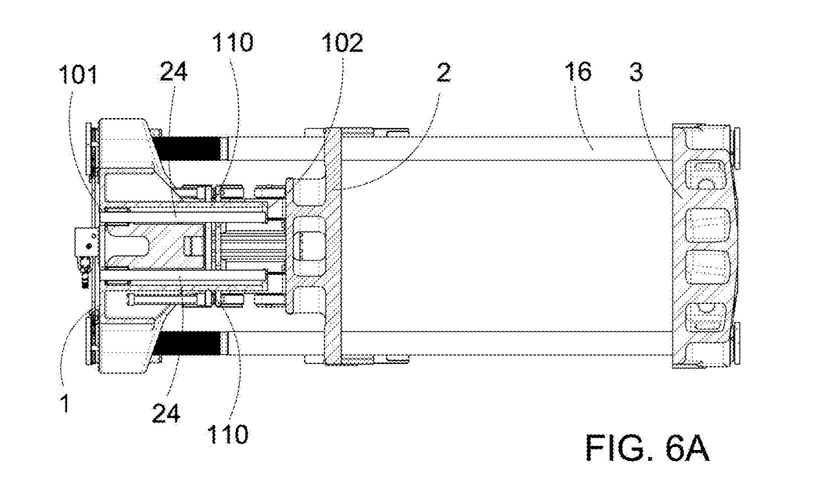
FIG. 6A is a median sectioned view like that of FIG. 5A, with the toggle in the condition of mould completely open.

In particular, as can be seen better in the horizontal sections of FIGS. 5A and 6A, the columns 24 of support and guide of the control element 6 are attached, at their two ends, to the opposite ends 101, 102 of corresponding supports 110 of the reaction plane 1 oriented towards the mobile plane 2.

This solution allows the maintaining of the levers horizontal and in a position such as to leave the space necessary for the extraction assembly, denoted by reference numeral 15. The control element 6, shown in isolation in FIG. 7, has four seats for guide bushings 21 for the sliding of the respective columns 24, two heads 25 with seat 22 for the pins of connection with the connecting rods 8, and two seats 23 for housing the control pistons 14.

As an alternative to the guide columns 24 and to the guide bushings 21 a system of guides can be used, constituted by sliding planes with slide shoes, or a system of recirculation guides with ball bearing or roller slide blocks in which the fixed part is integral with the reaction plane 1.

The particular configuration of the control element 6, of the reaction plane 1 and the position of installation allow high strokes of opening to be created, reducing to a minimum the overall dimension of the toggle.

FIG. 6 shows the toggle sectioned in the condition of mould completely open.

The control element 6 conserves the system of guides inside the toggle, typical of the systems with closure of the levers inwards, but brings to the exterior the heads 25 of connection with the connecting rods 8. In this way it is possible to compact the configuration and to make independent the main structure (the three planes and the control element) from the length of the main connecting rods 4, 5.

This condition allows the possibility of increasing the maximum stroke of opening, changing only the levers 4, 5 of the toggle, without having to intervene on the main structures.

Figure 8:
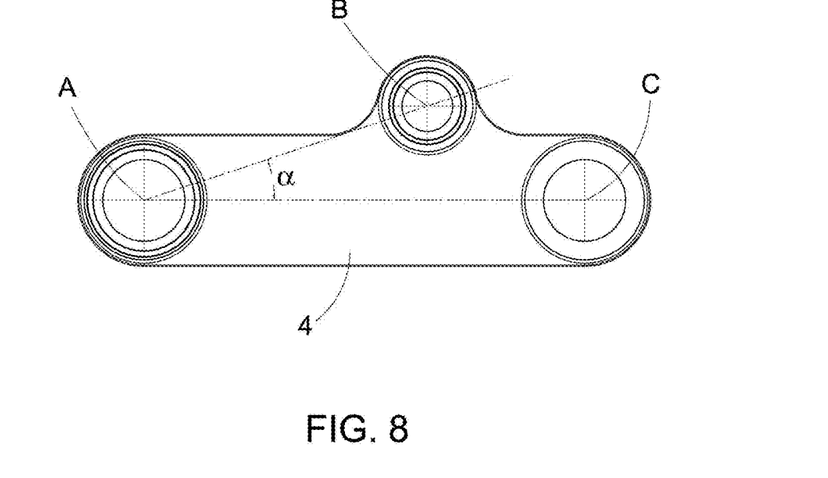
FIG. 8 is a plan view of the two main levers, shown separate, of an element of the toggle (double)

More particularly, by referring to FIG. 8, the distance between the points A and C of the lever 4 provided with the connection to the connecting rod 8 has to increase proportionally to the increase in the distance between the points D and E of the conjugated lever 5, while the distance between the points A and B of the first lever 4 has to remain unchanged as also the angle a between the straight lines A-B and A-C has to remain unchanged. In practice, therefore, the point C has to move linearly on the straight line A-C as the length of the lever 5 varies.

The increase in the stroke of opening is proportional to the increase in length of the connecting rods.

Moreover, in the solution proposed, the control element 6 is not guided on the main columns 16 of the toggle with the relative problems associated with the threads 10 of mould thickness regulation, with the weight and the need to create elements of support for the control element on the bed.

Figure 9A:
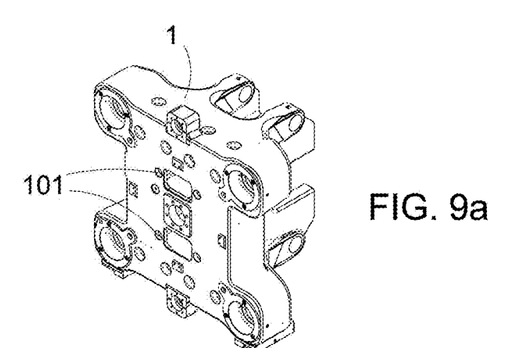
Figure 9B:
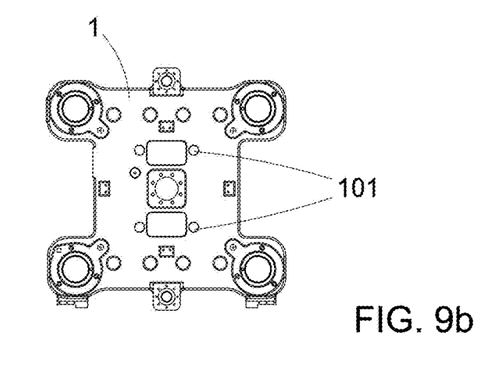

A further feature of this toggle is the I-shaped structure of the reaction plane 1, as shown in FIGS. 9a and 9b. This structure, possible for a toggle with opening of the levers outwards, optimises the weights of the structure and the features of rigidity of the element.

Figure 10:
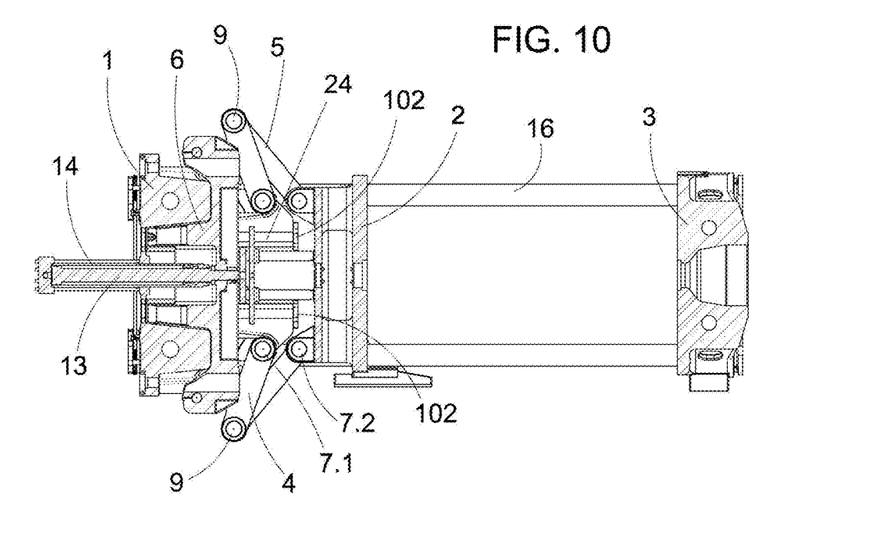
FIG. 10 is a median sectioned view showing a single central piston actuator for the actuation of the control element of the levers of the toggle.

As an alternative to the solution with the double piston for the actuation of the control element 6, as shown in FIG. 10, it is possible to use a single central piston, denoted again by reference numeral 14, restrained to the reaction plane 1, whose rod 13 is connected centrally to the control element 6.

It is also possible to carry out, for the actuation of the control element 6 of the levers, the movement by means of a pair of electric actuators with recirculating screws placed in the position previously occupied by the pair of cylinders 14 (FIGS. 2-6) or by means of a single electric actuator with recirculating screw placed in the position previously occupied by the central cylinder (FIG. 10).

Figure 11:
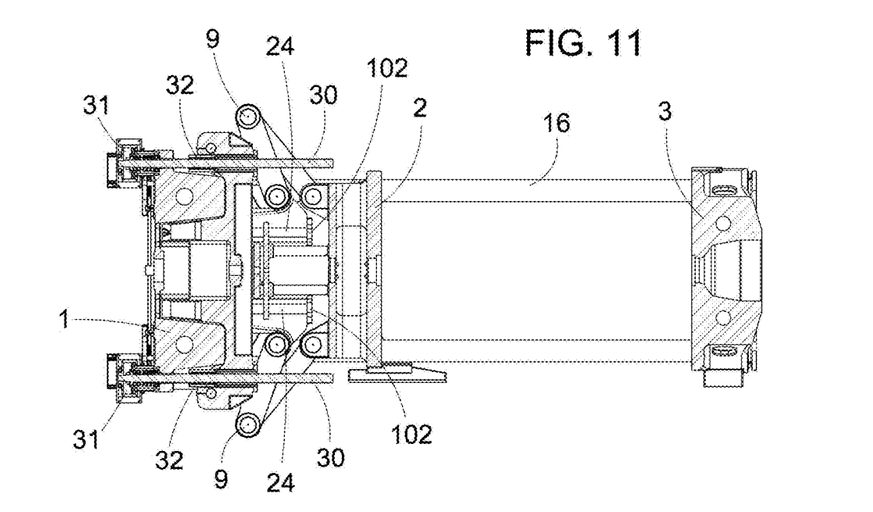
FIG. 11 is a median sectioned view showing two electric screw actuators for the actuation of the control element of the levers of the toggle.

FIG. 11 gives a representation of the first solution, in which two electrically powered screw actuators 30, driven by direct motors 31, actuate the control element 6 threading in respective screw grommets 32 integral with the control element 6.

Naturally the invention is not limited to the particular embodiments previously described and illustrated in the accompanying drawings, but numerous detailed changes may be made thereto, within the reach of the person skilled in the art, in any case coming within the scope of the invention as defined by the appended claims.

The invention claimed is:

1. A toggle mould closure assembly (100) for injection presses, comprising:
   a fixed plane (3), a mobile plane (2) and a reaction plane (1), all mounted on columns (16), and together forming a structure with two opposing sides;
   a control element (6);
   four pairs of levers (4, 5), arranged symmetrically at the two sides of the structure, each of said pairs connected one to the other by means of a respective central connection pin (9), and each of said pairs connected by respective pins (7.1, 7.2) to said reaction plane (1) and said mobile plane (2); and
   actuation means (13, 14; 30-32) of said control element (6),
   wherein the control element (6) is located on an axis of the structure in the middle of the pairs of levers (4, 5), which have an outward movement,
   wherein the control element (6) is connected, by means of control connecting rods (8), to levers (4) of the pairs of levers that are connected to the reaction plane (1), and is situated, during operation, between the central connection pins (9) of the pairs of levers (4, 5) and the reaction plane (1), wherein the control element is provided with heads (25) for connection to the connecting rods (8) external to the reaction plane and turned towards the reaction plane, and wherein the control element is mounted on guides fixed to the reaction plane, said guides constituted by either one of
  i) guide columns (24) fixed to said reaction plane, internal to the pairs of levers (4, 5), or
  ii) a system of recirculating guides with ball bearing or roller slide blocks guides, in which a fixed part is fixed to the reaction plane (1).

2. The toggle mould closure assembly (100) according to claim 1, wherein said pairs of levers (4, 5) are variable in length to achieve maximum strokes of opening independent of the structure of the toggle.

3. The toggle mould closure assembly (100) according to claim 1, wherein said actuation means (13, 14) of said control element (6) comprise two pistons (14) mounted integral with the control element (6), each of the two pistons (14) having a rod (13) that acts against said reaction plane (1).

4. The toggle mould closure assembly (100) according to claim 1, wherein said actuation means of said control element (6) comprise a single central piston (14) mounted integral to the reaction plane (1), the central piston (14) having a rod (13) that acts against the control element (6).

5. The toggle mould closure assembly (100) according to claim 1, wherein said actuation means of said control element (6) comprise two electrically operated screw actuators (30) driven by direct motors (31) integral with the reaction plane (1), said screw actuators (30) configured to actuate the control element (6) by threading in respective screw grommets (32) integral with the control element (6).

6. The toggle mould closure assembly (100) according to claim 1, wherein said actuation means of said control element (6) comprise a single central electric actuator that acts between said reaction plane (1) and said control element (6).

7. The toggle mould closure assembly (100) according to claim 1, wherein said reaction plane (1) is I-shaped.

8. The toggle mould closure assembly (100) according to claim 2, wherein said actuation means (13, 14) of said control element (6) comprise two pistons (14) mounted integral with the control element (6), each of the two pistons (14) having a rod (13) that acts against said reaction plane (1).

9. The toggle mould closure assembly (100) according to claim 2, wherein said actuation means of said control element (6) comprise a single central piston (14) mounted integral to the reaction plane (1), the central piston (14) having a rod (13) that acts against the control element (6).

10. The toggle mould closure assembly (100) according to claim 2, wherein said actuation means of said control element (6) comprise two electrically operated screw actuators (30) driven by direct motors (31) integral with the reaction plane (1), said screw actuators (30) configured to actuate the control element (6) by threading in respective screw grommets (32) integral with the control element (6).

11. The toggle mould closure assembly (100) according to claim 2, wherein said actuation means of said control element (6) comprise a single central electric actuator that acts between said reaction plane (1) and said control element (6).

12. The toggle mould closure assembly (100) according to claim 2, wherein said reaction plane (1) is I-shaped.

13. The toggle mould closure assembly (100) according to claim 3, wherein said reaction plane (1) is I-shaped.

14. The toggle mould closure assembly (100) according to claim 4, wherein said reaction plane (1) is I-shaped.

15. The toggle mould closure assembly (100) according to claim 5, wherein said reaction plane (1) is I-shaped.

16. The toggle mould closure assembly (100) according to claim 6, wherein said reaction plane (1) is I-shaped.

17. The toggle mould closure assembly (100) according to claim 8, wherein said reaction plane (1) is I-shaped.

18. The toggle mould closure assembly (100) according to claim 9, wherein said reaction plane (1) is I-shaped.

19. The toggle mould closure assembly (100) according to claim 10, wherein said reaction plane (1) is I-shaped.

* * * * *